(12) United States Patent
Kinoshita et al.

(10) Patent No.: US 7,707,597 B2
(45) Date of Patent: Apr. 27, 2010

(54) DISK-LIKE RECORDING MEDIUM CONVEYANCE DEVICE

(75) Inventors: Hideki Kinoshita, Kawagoe (JP); Akira Yasaki, Kawagoe (JP); Jun Togashi, Kawagoe (JP); Shigeru Kojima, Kawagoe (JP); Yasuhiro Shinkai, Kawagoe (JP); Yasuyuki Noboribayashi, Nagoya (JP)

(73) Assignee: Pioneer Corporation, Tokyo (JP)

( * ) Notice: Subject to any disclaimer, the term of this patent is extended or adjusted under 35 U.S.C. 154(b) by 524 days.

(21) Appl. No.: 11/664,732

(22) PCT Filed: Sep. 29, 2005

(86) PCT No.: PCT/JP2005/017923

§ 371 (c)(1), (2), (4) Date: Apr. 5, 2007

(87) PCT Pub. No.: WO2006/038512

PCT Pub. Date: Apr. 13, 2006

(65) Prior Publication Data

US 2009/0019463 A1 Jan. 15, 2009

(30) Foreign Application Priority Data

Oct. 5, 2004 (JP) ............................. 2004-292830

(51) Int. Cl.
*G11B 17/04* (2006.01)

(52) U.S. Cl. ...................................................... 720/621

(58) Field of Classification Search ................... None
See application file for complete search history.

(56) References Cited

U.S. PATENT DOCUMENTS

| | | | | |
|---|---|---|---|---|
| 6,028,831 | A * | 2/2000 | Scholz et al. | 720/621 |
| 6,463,025 | B1 * | 10/2002 | Scholz | 720/622 |
| 6,799,321 | B2 * | 9/2004 | Nakamichi | 720/621 |
| 7,007,285 | B2 * | 2/2006 | Suzuki | 720/621 |
| 7,100,178 | B2 * | 8/2006 | Ho et al. | 720/621 |
| 7,266,828 | B2 * | 9/2007 | Inoue | 720/621 |
| 7,322,036 | B2 * | 1/2008 | Hirano et al. | 720/621 |
| 7,353,522 | B2 * | 4/2008 | Suzuki | 720/621 |
| 2003/0099182 | A1 * | 5/2003 | Maeda et al. | 369/77.1 |
| 2003/0174627 | A1 * | 9/2003 | Suzuki | 369/77.1 |

FOREIGN PATENT DOCUMENTS

| | | |
|---|---|---|
| JP | 60-106250 | 7/1985 |
| JP | 8-339599 | 12/1996 |
| JP | 2000-132895 | 5/2000 |
| JP | 2002-3047798 | 10/2002 |
| JP | 2002-367261 | 12/2002 |

* cited by examiner

*Primary Examiner*—Mark Blouin
(74) *Attorney, Agent, or Firm*—Kratz, Quintos & Hanson, LLP

(57) ABSTRACT

A transport unit 41 includes a holding section 41A that holds a disc 11 and a transport section 41B that transports the disc 11. Since the disc 11 is held by the holding section 41A when the disc 11 is transported, the disc 11 is prevented from being disengaged from the transport section 41B, so that a transport distance of the disc 11 can be lengthened.

8 Claims, 9 Drawing Sheets

DISK-LIKE RECORDING MEDIUM CONVEYANCE DEVICE

TECHNICAL FIELD

The present invention relates to a disc recording medium transport device that transports a disc recording medium.

BACKGROUND ART

There have been being widely used disc recording media as a transportable information recording medium used in a computer system or an image/audio recorder/reproducer, the disc recording medium typically being a CD (compact disc) and a DVD (digital versatile disc).

Although there is known a disc recording medium that is loaded in the recorder/reproducer in a state in which the medium is housed in a case or caddy, a disc recording medium that is loaded with its disc body exposed is widely used.

As a recorder/reproducer (or a computer system) in which the exposed disc recording medium is loaded, a slot-in type recorder/reproducer will be described.

The slot-in type recorder/reproducer employs a transport mechanism that includes an injection/ejection slot through which a disc can be passed, a roller that contacts with the disc inserted from the insertion/ejection slot, a transport motor that rotates the roller and the like. In order to load the disc, when a circumferential end of the disc recording medium is inserted into the insertion/ejection slot, the roller contacts with a back surface of the disc recording medium and the roller is rotated by the transport motor, whereby the disc recording medium is transported to a predetermined position in Related Art 1 or the disc recording medium is sandwiched by a pair of the rollers from its diametrical sides to be transported in Related Art 2 (see Patent Document 1).

In Related Art 1, a surface of the rollers is coated with a rubber material, and the roller is tapered such that the diameter thereof is small at a middle portion and increases toward both end portions. With the arrangement, although the roller contacts with the disc recording medium from a recording surface side, the roller mainly contacts with the circumferential end portion of the recording surface so that an influence on the recording surface can be minimized.

Provided on a side opposite to the roller is a guide member for maintaining the disc recoding medium on a transport path. The guide member is formed in a rib shape extending in a direction intersecting with a transport direction of the disc recording medium in order to meet a front-width variation depending on its insertion depth of the disc recoding medium or to meet a later-described difference in diameters of disc recoding media. The rib-like guide member is so formed as to contact with the circumferential end portion of the disc recoding medium in order to prevent or reduce an influence (e.g., wear) on the surface of the disc recording medium.

With the arrangement, the rib-like guide member has a predetermined inclination such that the height of the guide member is large (a projection amount is large) at both end sides of the slot and small at a middle portion of the slot, namely the height increases toward the both end sides.

In such a related art slot-in type recorder/reproducer, the transport mechanism needs to be actuated when a portion of the disc recording medium is inserted from the slot. For this purpose, a disc recording medium transport device is provided with a contact-type detection mechanism that is arranged on an inner side of the slot. In addition, there are two diameter types (12 cm and 8 cm) in CDs or the like, and the difference in diameters is also detected by the detection mechanism.

The detection mechanism includes a guide rail provided along the inner side of the slot, a moving member provided so as to be movable along the guide rail, a contact member (e.g., a projection) that is provided on the moving member and contacts with the circumferential end of the disc and a plurality of switches that is disposed on predetermined positions along the guide rail to detect passage of the moving member.

Typically, the moving member provided with the contact member and the guide rail are arranged as a unit and a pair of the units is disposed on both sides of the slot. By disposing the pair of units, even when the center of the inserted disc recording medium is slightly displaced, the front width of the inserted disc can be accurately detected as a distance between the contact members on both sides.

In the contact-type detection mechanism, when the disc recording medium is inserted into the slot by a predetermined depth, the contact members are pushed outward by the circumference end of the disc to reach the predetermined front width that causes the transport motor to be actuated.

One of the switches is disposed at a position where it is disconnected when the predetermined front width causing the transport motor to be actuated is exceeded, and this switch disconnection actuates the transport motor associated with the insertion of the disc recording medium.

The guide rails each have a sufficient width extending to reach an end of the slot, which allows the contact members to move along the guide rails together with the moving members and to be opened wider than the diameter of the transported disc, so that the passage of the disc is not impeded.

Another ones of the switches are so set as to be each disconnected when the maximum width (diameter) of the passing disc recording medium is 12 cm or 8 cm, thereby detecting the diameter of the inserted disc.

Related Art 2 disclosed in Patent Document 1 includes a pair of roller mechanisms disposed near the both ends of the slot for sandwiching the disc recording medium from the diametrical sides thereof, the roller mechanisms each including rollers adapted to move toward or apart from each other. In order to transport the disc recording medium to a predetermined position in the device, each of the roller mechanisms includes two pairs of the rollers that are provided along the transport direction.

[Patent Document 1] JP-A-2002-304798 (FIG. 1)

DISCLOSURE OF THE INVENTION

Problems to be Solved by the Invention

In Related Art 1, in the long bar-like roller that is tapered and horizontally arranged, by greatly varying the diameter between the both end portions and the middle portion, an inclination angle of the tapered shape of a peripheral surface of the roller relative to the back surface of the disc can be increased, so that the roller can contact only with the circumferential end of the disc.

However, the height should not be large in order to realize a thin-type recorder/reproducer. For example, the variation in radius between the both end portions and the middle portion is restricted to be about 1 mm at largest. When the length of the roller is arranged to meet the diameter of the disc under such a restriction, the variation in the radius is only 1 mm in one half side of 60 mm long, so that the roller becomes almost flat and thus a sufficient inclination cannot be obtained.

When the sufficient inclination cannot be obtained in the tapered peripheral surface of the roller, in a case where the roller or the guide rail is deformed due to a press-contact of the disc, an initial inclination cannot be maintained and it becomes difficult to hold the circumferential end of the disc, which causes adverse influences such as a scratch and a wear on the recording surface or a label surface of the disc.

In Related Art 2, since the peripheral surfaces of the pair of rollers are brought into contact with an outer circumferential portion of the disc recording medium, a transport amount of the disc is small. Especially, when a distance between the rollers is small, the rollers slip on the outer circumferential portion of the disc recording medium, so that the transport amount of the disc becomes even smaller.

Accordingly, in Related Art 2, two pairs of the rollers (i.e., four rollers in total) are required to be provided along the transport direction in order to transport the disc recording medium to a predetermined position, so that a large space is required for disposing the rollers.

In addition, in Related Art 2, since the central axes of the rollers are disposed on an outer side of the disc recording medium, a space in a width direction of the transport device (a longitudinal direction of the slot) is also required.

Therefore, although downsizing of the slot-in type recorder/reproducer has been demanded, sufficient downsizing of the device cannot be achieved by Related Art 2.

An object of the present invention is to provide a downsized disc recording medium transport device that is capable of securely transporting a disc recording medium while avoiding contact with front and back surfaces of the disc recording medium.

Means for Solving the Problems

According to an aspect of the present invention, a disc recording medium transport device that transports a disc recording medium between an insertion/ejection slot and a rotary drive position includes a transport unit that is movable between a central area and lateral side areas of a transport path in a manner slidably contacting with around a circumferential end portion of the disc recording medium that is being transported, the transport unit including a holding section that holds the disc recording medium and a transport section that transports the disc recording medium, the transport section including a drive roller that contacts with around the circumferential end portion on a principal plane of the disc recording medium, the drive roller being a cylindrical roller with its central axis being a rotation shaft, the rotation shaft being a cylindrical roller that is inclined relative to a direction vertical to the principal planes of the disc recoding medium by a predetermined angle.

EXPLANATION OF CODES

| | |
|---|---|
| 10: | recorder/reproducer |
| 11: | disc (disc recording medium) |
| 12: | insertion/ejection slot |
| 14: | transport path |
| 29: | receiving member |
| 30: | recording/reproducing mechanism |
| 31: | pickup |
| 32: | moving member |
| 34: | motor |
| 40: | transport mechanism |
| 41: | transport unit |
| 42: | contact section |
| 43: | drive roller |
| 44: | roller base |
| 45: | inclined rotation shaft |
| 46: | support shaft |
| 47: | horizontal gear |
| 48: | base member |
| 40: | hood member (pressing member) |
| 50: | compression spring |
| 51: | rotating arm |
| 52: | holder |
| 52A: | holder shaft |

BEST MODE FOR CARRYING OUT THE INVENTION

Now, an embodiment of the present invention will be described with reference to the attached drawings.

First Embodiment

FIGS. 1 to 8 show a first embodiment.

Figure 1:
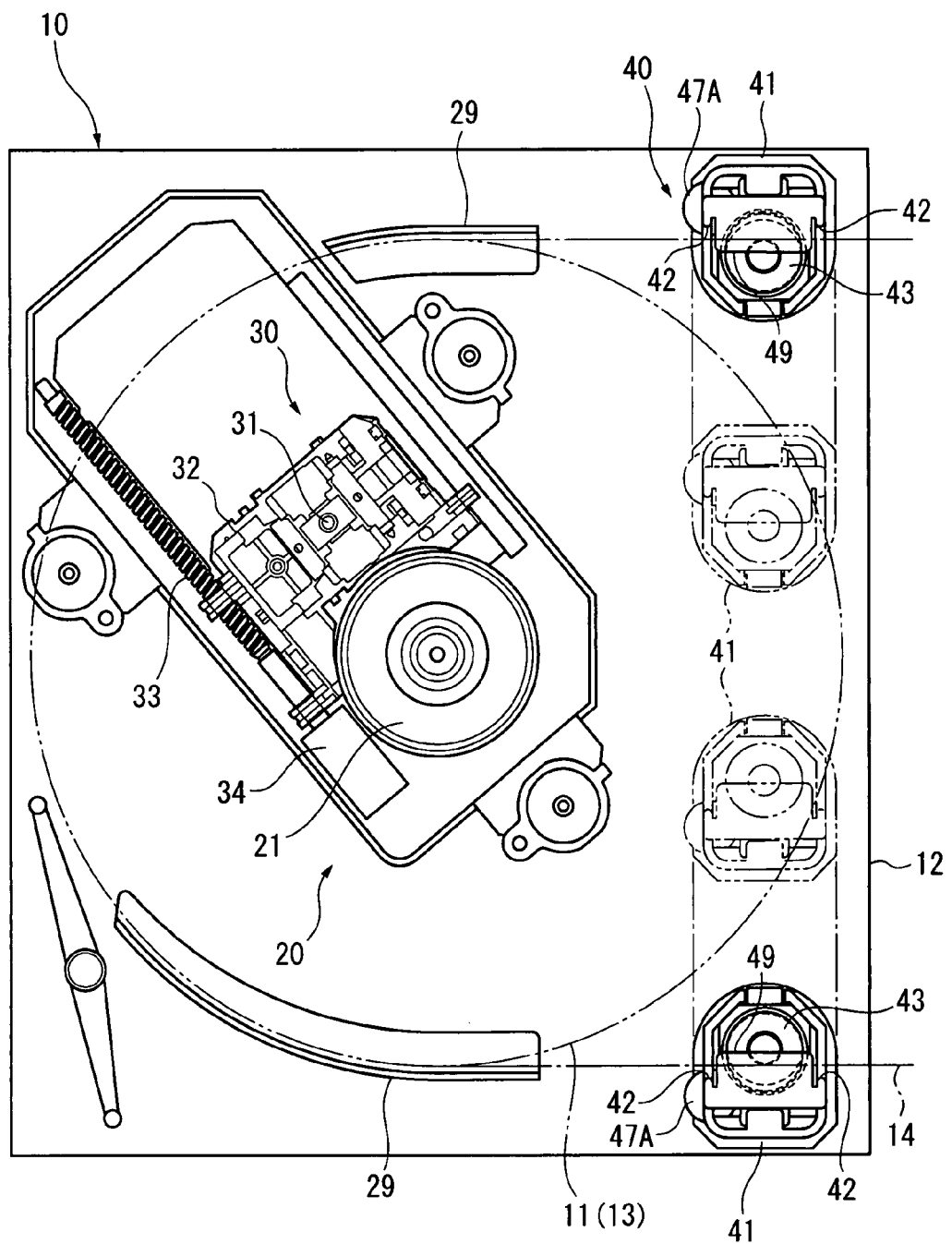
FIG. 1 is a partially-omitted plan view showing a disc loading state of a disc recording medium transport device according to a first embodiment of the present invention.
Figure 2:
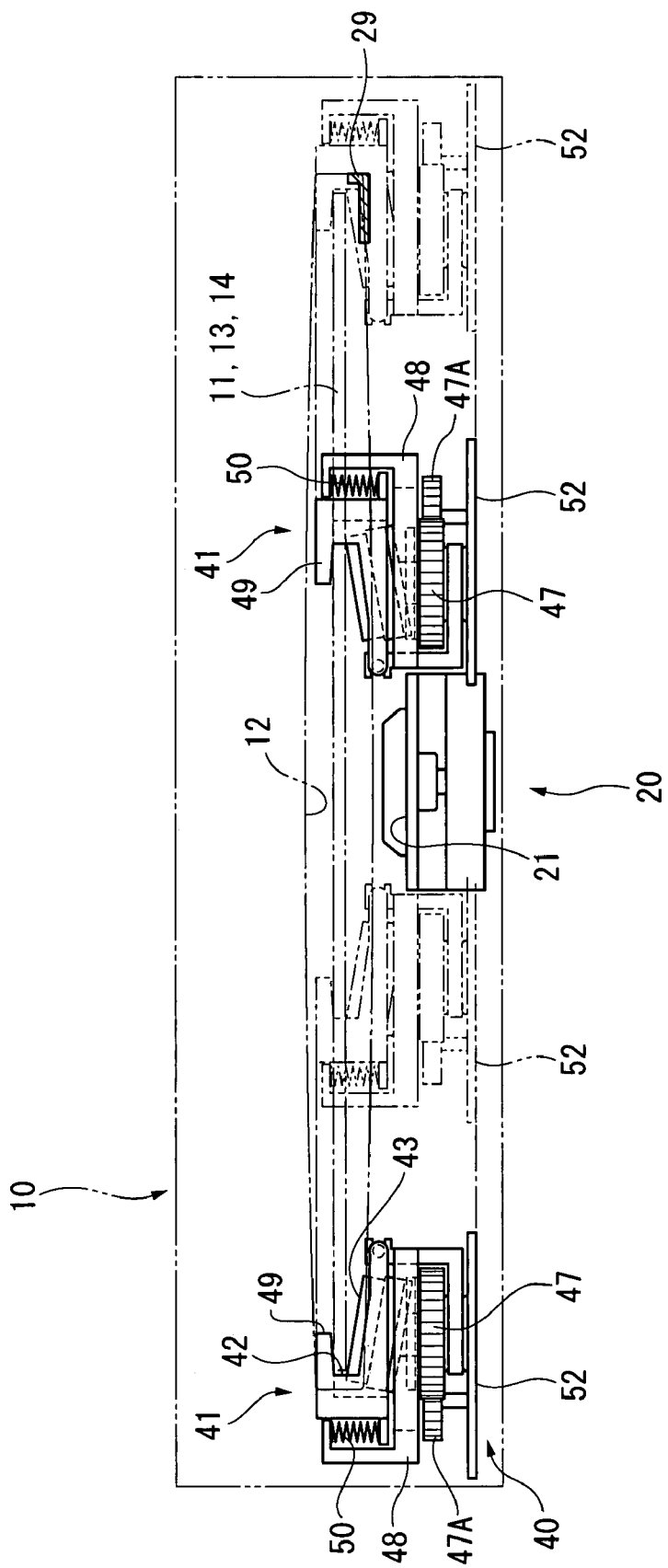
FIG. 2 is a partially-omitted side view of the disc recording medium transport device according to the first embodiment.

Referring to FIGS. 1 and 2, the first embodiment relates to a recorder/reproducer 10 that records data on and/or reproduces data from a CD or a DVD.

The recorder/reproducer 10 has a case having a typical rectangular parallelepiped shape, and an insertion/ejection slot 12 through which a disc 11 is inserted is provided on a front surface side of the case.

Arranged in the recorder/reproducer 10 are a rotary drive mechanism 20 that rotates the disc recoding medium 11 (hereinafter, referred to simply as the disc 11), a recording/reproducing mechanism 30 that records data on and/or reproduces data from the disc 11, a transport mechanism 40 that transports the disc 11 and a detection mechanism (not shown) that detects insertion of the disc 11.

The rotary drive mechanism 20 holds and rotates the disc 11 transported by the transport mechanism 40 on a rotation position 13, the rotary drive mechanism 20 including a receiving member 29 that holds the disc 11 in an assisting manner when receiving the disc 11 transported by the transport mechanism 40, a hub 21 that clamps a central hole of the received disc 11 and a motor (not shown) that rotates the hub 21.

The hub 21 has a tapered cone shape that can be inserted into the central hole of the disc 11, the hub 21 being capable of automatically detecting an axial center position of the disc 11 even when the disc 11 having been transported by the transport mechanism 40 is slightly displaced from the rotation position 13.

The recording/reproducing mechanism 30 includes a pickup 31 suitable for the disc 11. The pickup 31 is formed by a laser optical pick up when the disc 11 is a typical CD or DVD.

The pickup 31 is supported on a moving member 32 that is movable in a radial direction of the disc 11, the moving member 32 accurately positioned in the radial direction of the disc 11 by a feed screw 33 and a motor 34. With the arrangement, the pickup 31 can write information on or read information from the entire area extending from the innermost circumference to the outermost circumference of a back surface (recording surface) of the disc 11 that is rotated on the rotation position 13 by the rotary drive mechanism 20.

The transport mechanism 40 transports the disc 11 inserted in the insertion/ejection slot 12 along a predetermined transport path 14.

The transport path 14 is an imaginary path extending from the insertion/ejection slot 12 to the predetermined rotation position 13, which is shown by the chain double-dashed line in the drawing. The disc 11 is transported on the transport path 14 in its plane direction (a direction along surfaces of the disc).

The transport mechanism 40 includes transport units 41 immediately on an inner side of the insertion/ejection slot 12 in order to transport the disc 11 along the transport path 14.

A pair of the transport units 41 is disposed on both of right and left sides of the transport path 14, the pair of the transport units 41 transporting the disc 11 by holding the disc 11 from the both sides of the transport path 14 in a manner slidably contacting with a circumferential end of the disc 11 and moving the circumferential end of the holding disc 11 in its circumferential direction.

When the disc 11 is moved along the transport path 14, both sides of the disc 11 held by the transport units 41 define a width (width in a transport direction) of a portion passing through the inner side of the insertion/ejection slot 12 where the transport unit 41 is disposed, the width of the portion varying continually (see, FIGS. 5 to 8).

Due to the arrangement, the transport units 41 are supported by a moving mechanism (not shown) so as to be movable between lateral sides and a central area of the transport path 14 along the insertion/ejection slot 12.

The moving mechanism at least includes a guide rail that supports the transport units 41 so as to be movable along the insertion/ejection slot 12, a screw or the like that biases the transport units 41 in a direction toward each other (in a direction toward the center of the transport path) and a retracting mechanism that maintains the transport units 41 at the outermost positions of the guide rail (outer sides of the transport path 14) by a signal from the outside. The retracting mechanism may be mechanically realized by a known technology such as a hook and a motor.

The transport unit 41 includes a holding section 41A that holds the disc 11 and a transport section 41B that transports the disc 11, the holding section 41A and the transport section 41B arranged on a base member 48.

The transport section 41B includes a drive roller 43 that contacts with around the circumferential end portion on a principal plane of the disc 11, a roller base 44 that is coaxially and integrally provided with the drive roller 43, a horizontal gear 47 that rotates the roller base 44 and a drive gear 47A that rotates the horizontal gear 47.

A holder 52 is supported so as to be movable on the above-described guide rail along the insertion/ejection slot 12.

The base member 48 is rotatably supported by a holder shaft 52A projected from the holder 52. The holder 52 serves as a part of the moving mechanism descried above. A rotation axis of the base member 48 defined by the holder shaft 52A is vertical to the principal plane of the disc.

The drive roller 43 is a cylindrical roller with its upper surface exposed from an upper opening of the base member 48, the drive roller 43 supported by the roller base 44. The roller base 44 is rotatably supported by an inclined rotation shaft 45 that is fixed on a tip end of a support shaft 46 projecting on an inner side of the base member 48.

The inclined rotation shaft 45 of the roller base 44 and the drive roller 43 is inclined relative to an orthogonal axis of the principal plane of the disc. In other words, the base member 48, the support shaft 46 and the inclined rotation shaft 45 are integrally rotatable around the holder shaft 52A.

Figure 3:
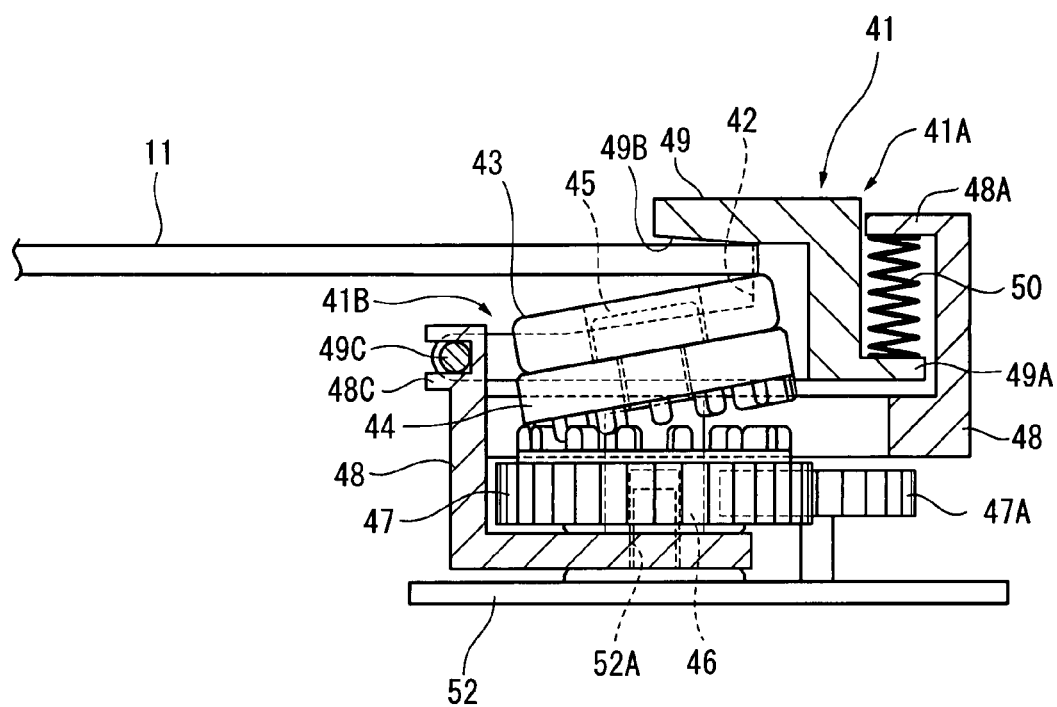
FIG. 3 is a cross section showing a primary portion according to the first embodiment in an enlarged manner.
Figure 4:
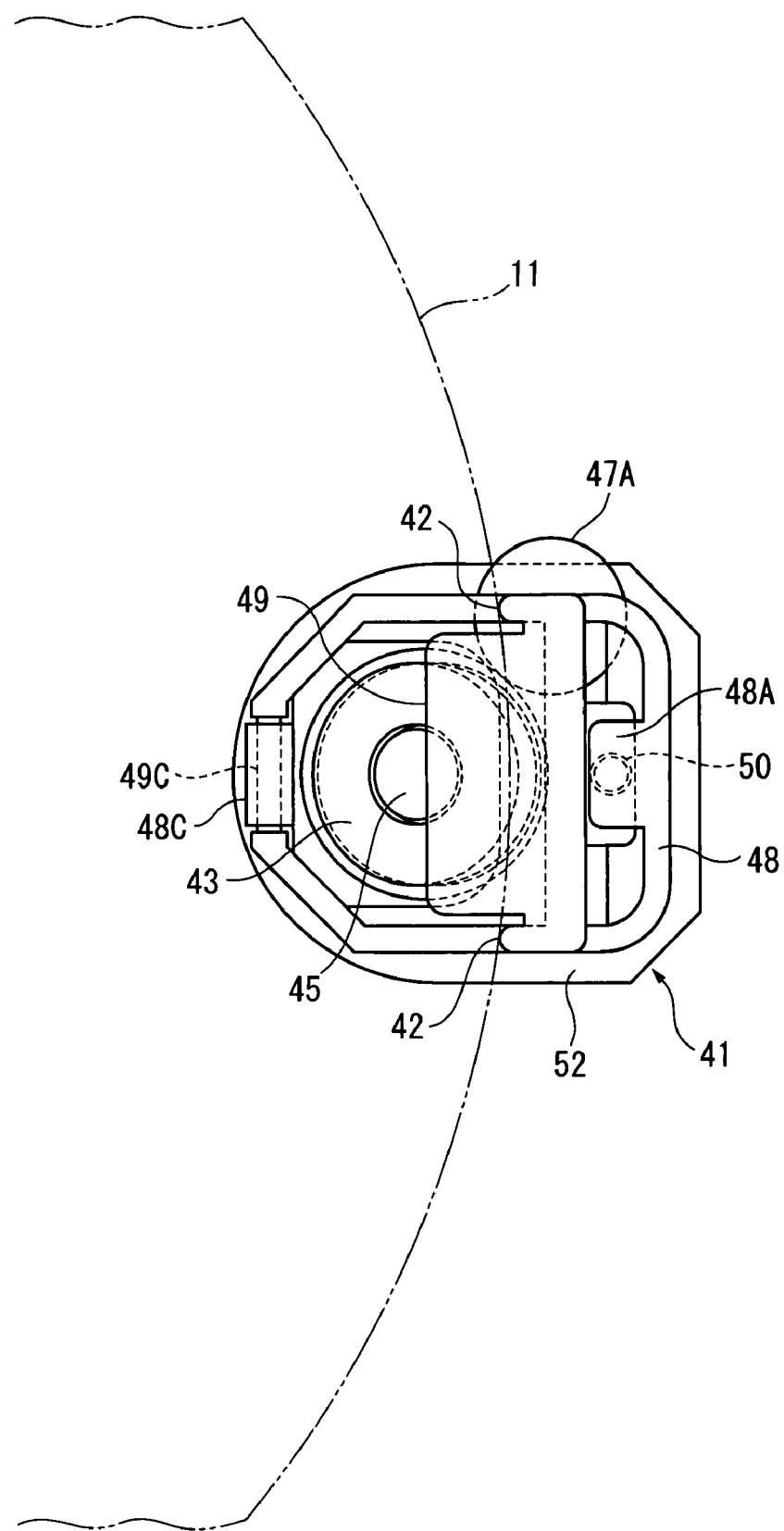
FIG. 4 is a flat view of the primary portion according to the first embodiment in an enlarged manner.

The drive roller 43 is disposed in an inclined state in which a part of a circumferential end of the upper surface (that is, the axial-end surface at the end of the lead line of numeral 43 in FIG. 3) is positioned high while a side opposite to the part is positioned low due to the inclination of the above-described inclined rotation shaft 45, the circumferential end at the high side adapted to roll on the disc 11. The entire surface or at least a portion rolling on the disc 11 of the surface of the drive roller 43 is formed of an elastomer material such as a rubber so that the drive roller 43 can contact with the disc 11 with a predetermined friction force.

A gear of a transfer-pin type is formed on a lower surface side of the roller base 44. A horizontal gear 47 is coaxially supported by the support shaft 46 below the roller base 44.

A gear corresponding to the roller base 44 is formed on an upper surface side of the horizontal gear 47, the horizontal gear 47 and a low side of the roller base 44 meshing with each other. In addition, a spur gear is formed on a lateral surface of the horizontal gear 47, which meshes with the drive gear 47A. A drive of a motor (not shown) is transmitted to a gear set (not shown) and a rotation is transmitted from the gear set to the drive gear 47A, thereby rotating the horizontal gear 47, the roller base 44 and the drive roller 43.

The drive roller 43 is arranged such that an intersection point of the inclined rotation shaft 45 and the principal plane of the disc 11 is positioned on a side of the center of the disc 11 relative to the outer diameter of the disc 11 during the transport of the disc 11. With the arrangement, the drive roller 43 does not protrude outward from the outer diameter of the disc 11 during the transport of the disc 11, thereby realizing space-saving and downsizing of the device.

The holding section 41A includes a hood member 49 (a pressing member) that sandwiches the disc with the drive roller 43 and a compression spring 50 that biases the hood member 49 toward the drive roller 43, the hood member 49 contacting with a principal plane of the disc 11 that is opposite to the principal plane with which the drive roller 43 contacts so as to press the disc 11 against the drive roller 43.

The hood member 49 is formed like a cantilevered roof covering portions of the base member 48 and the drive roller 43, the hood member 49 provided with an inclined surface 49B that slidably contacts with around the circumferential end portion of the disc 11, the hood member 49 formed at a position opposing the drive roller 43.

A distance between the inclined surface 49B of the hood member 49 and the highest portion of the circumferential end of the drive roller 43 is formed to be smaller than the thickness of the disc 11. With the arrangement, when the circumferential end of the disc 11 is inserted between the inclined surface 49B and the highest portion of the drive roller 43 against a biasing force of the compression spring 50, an inclined lower surface of the hood member 49 functions as the pressing member and presses the disc 11 against the drive roller 43 so as to roll on the disc 11, so that the circumferential end of the disc 11 is driven in the circumferential direction.

The hood member 49 includes a pair of contact sections 42 that interposes therebetween a contact point at which the drive roller 43 contacts with the principal plane of the disc 11, the pair of contact sections 42 each contacting with a lateral surface of the disc 11 in a radial direction of the disc 11.

The pair of contact sections 42 is disposed so as to interpose therebetween the contact point where the drive roller 43 contacts with the disc 11, the pair of contact sections 42 each contacting with the lateral surface of the disc 11 in the radial direction of the disc 11.

When the disc 11 is inserted in a space between the hood member 49 and the drive roller 43, the pair of contact sections 42 contacts with the lateral surface of the disc 11, thereby restricting the disc 11 from being further inserted. Accordingly, a predetermined state in which the lateral surface of the disc 11 is positioned between the drive roller 43 and the hood member 49 is constantly maintained.

The base member 48 rotates in such a manner that at least one of the contact sections 42 contacts with the lateral surface of the disc 11, so that the one of the contact sections 42 is pressed against the lateral surface of the disc 11 even when a direction of a tangent line on the circumferential end of the disc 11 is changed. Due to the rotation of the base member 48, the state in which the circumferential end of the disc 11 is held and moved is constantly maintained.

The hood member 49 is rotatably attached to the base member 48 via a support shaft 49C and the compression spring 50 is provided between a rotation end side of the hood member 49 and the base member 48. The compression spring 50 is a compression coil spring, an end of which is held by a holding end 49A formed on the hood member 49 while the other end of which is held by a holding end 48A formed on the base member 48.

The support shaft 49C is integrally formed on the hood member 49. A supporting section 48C that has a C-shape cross section and rotatably supports the support shaft 49C is integrally formed on the base member 48.

Note that a coil spring (not shown) that is coaxial to the holder shaft 52A is provided between the base member 48 and the holder 52 supporting the base member 48. Although the base member 48 is normally oriented in a direction in which this coil spring is free from loading (the state shown in FIG. 5), the base member 48 is rotatable so as to be oriented in a suitable direction against the coil spring when the contact sections 42 contacts with the disc 11. However, the base member 48 is so arranged as to be oriented in an original direction (the state shown in FIG. 5) once the contact with the disc 11 is released.

According to the first embodiment described above, the following operations are performed.

Figure 5:
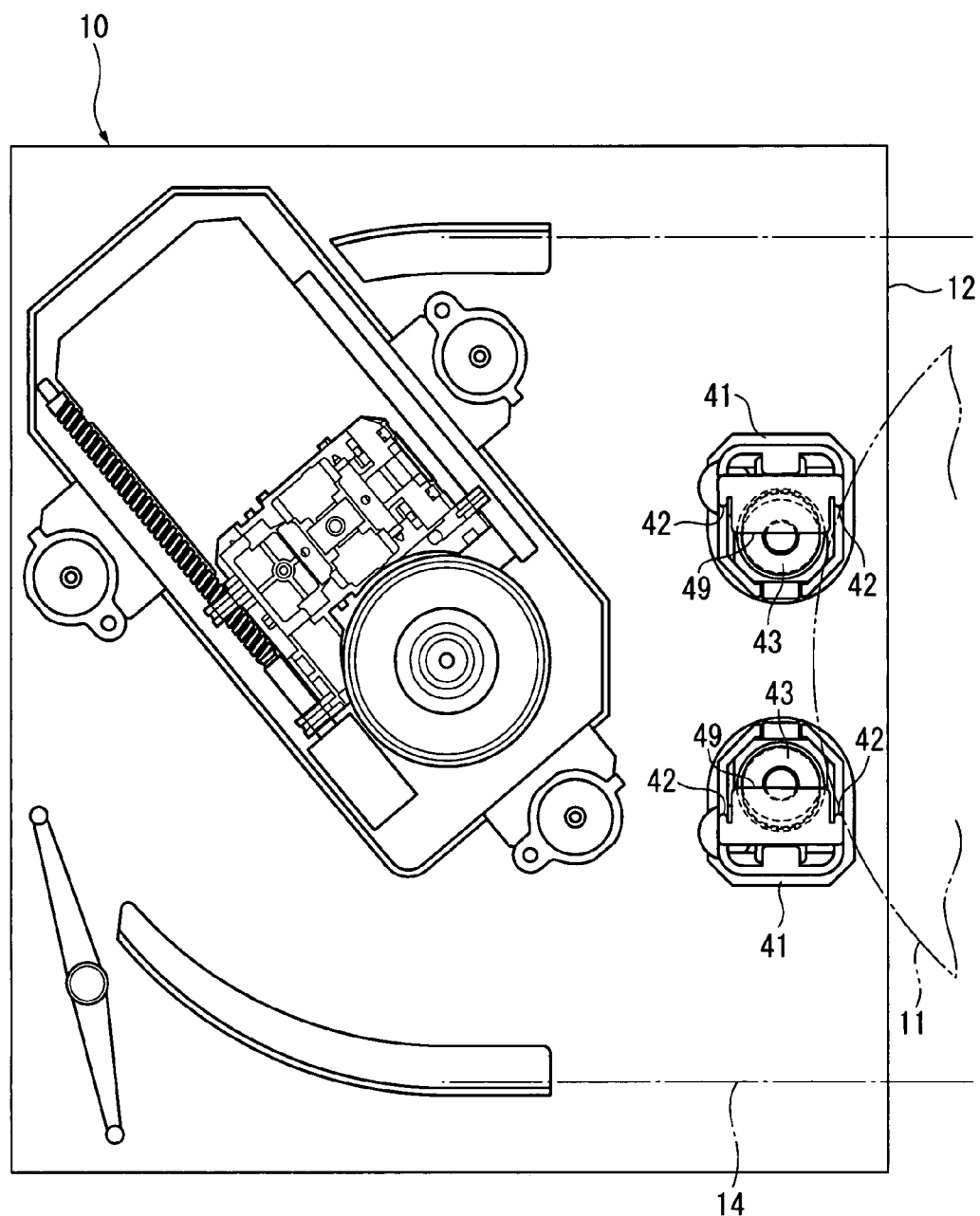
FIG. 5 is a partially-omitted plan view showing a disc insertion state of the disc recording medium transport device according to the first embodiment.

When the disc 11 is not inserted in the recorder/reproducer 10, the transport units 41 are maintained to be closest to each other (see FIG. 5).

When the disc 11 is inserted into the insertion/ejection slot 12, the lateral surface of the disc 11 contacts with the respective contact sections 42 on the insertion/ejection slot 12 side of the transport units 41, which rotates the base members 48 to bring the pair of contact sections 42 of each of the transport units 41 into contact with the disc 11. In short, opening sides of the hood members 49 are oriented toward the disc 11. Here, the drive roller 43 on the right side in an insertion direction is rotated clockwise, while the drive roller 43 on the left side is rotated counterclockwise.

Figure 6:
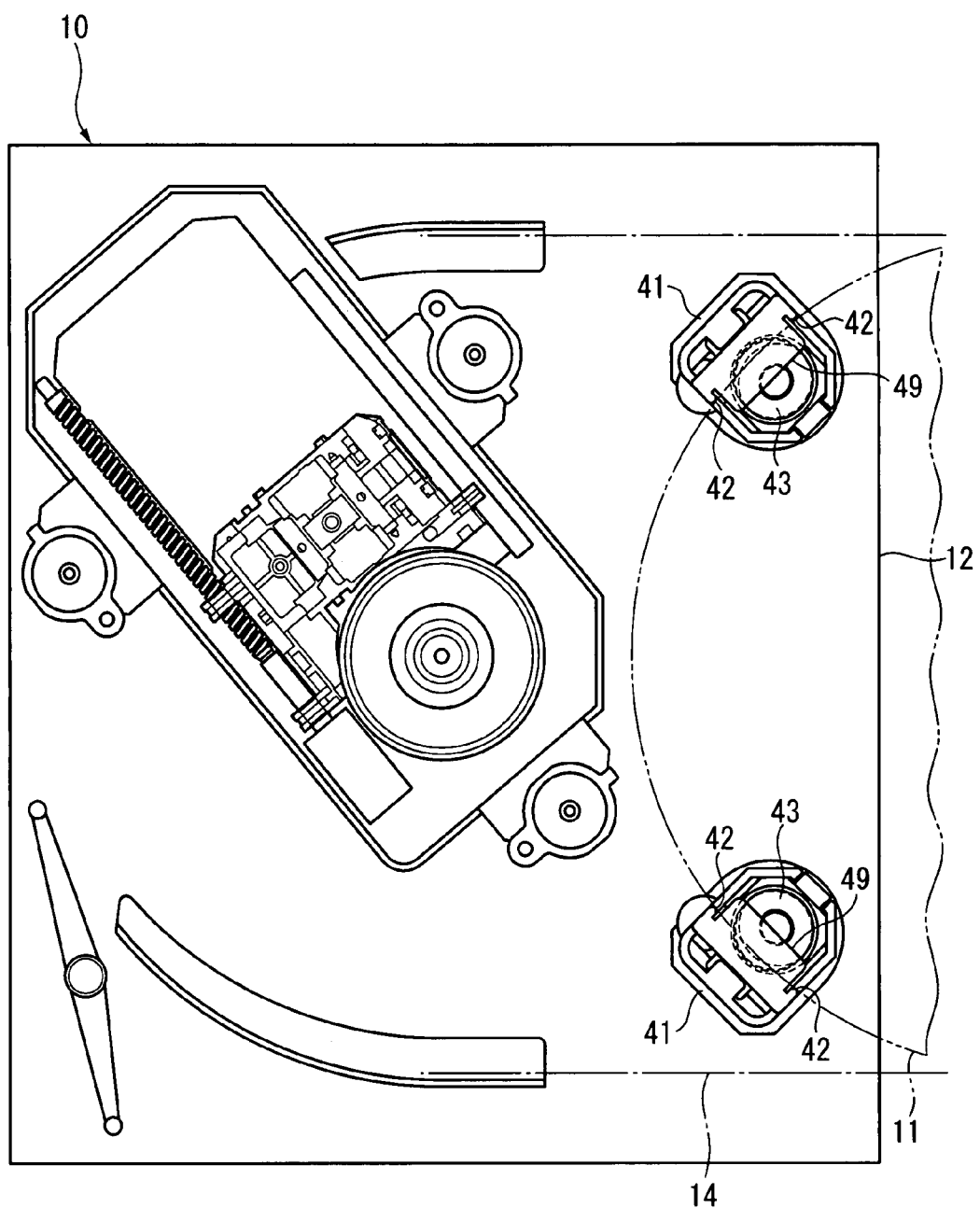
FIG. 6 is a partially-omitted plan view showing a disc transport state of the disc recording medium transport device according to the first embodiment.
Figure 7:
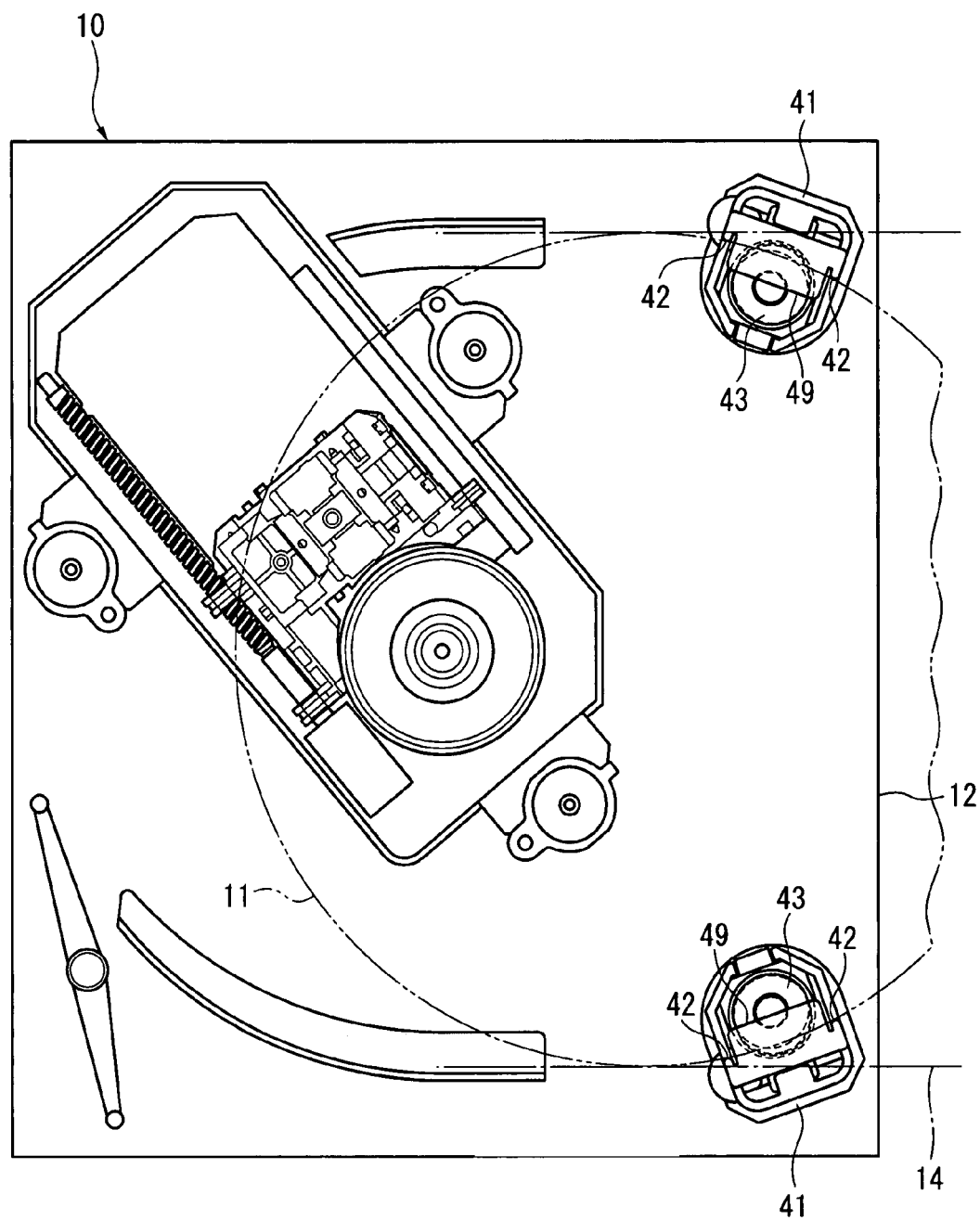
FIG. 7 is another partially-omitted plan view showing the disc transport state of the disc recording medium transport device according to the first embodiment.
Figure 8:
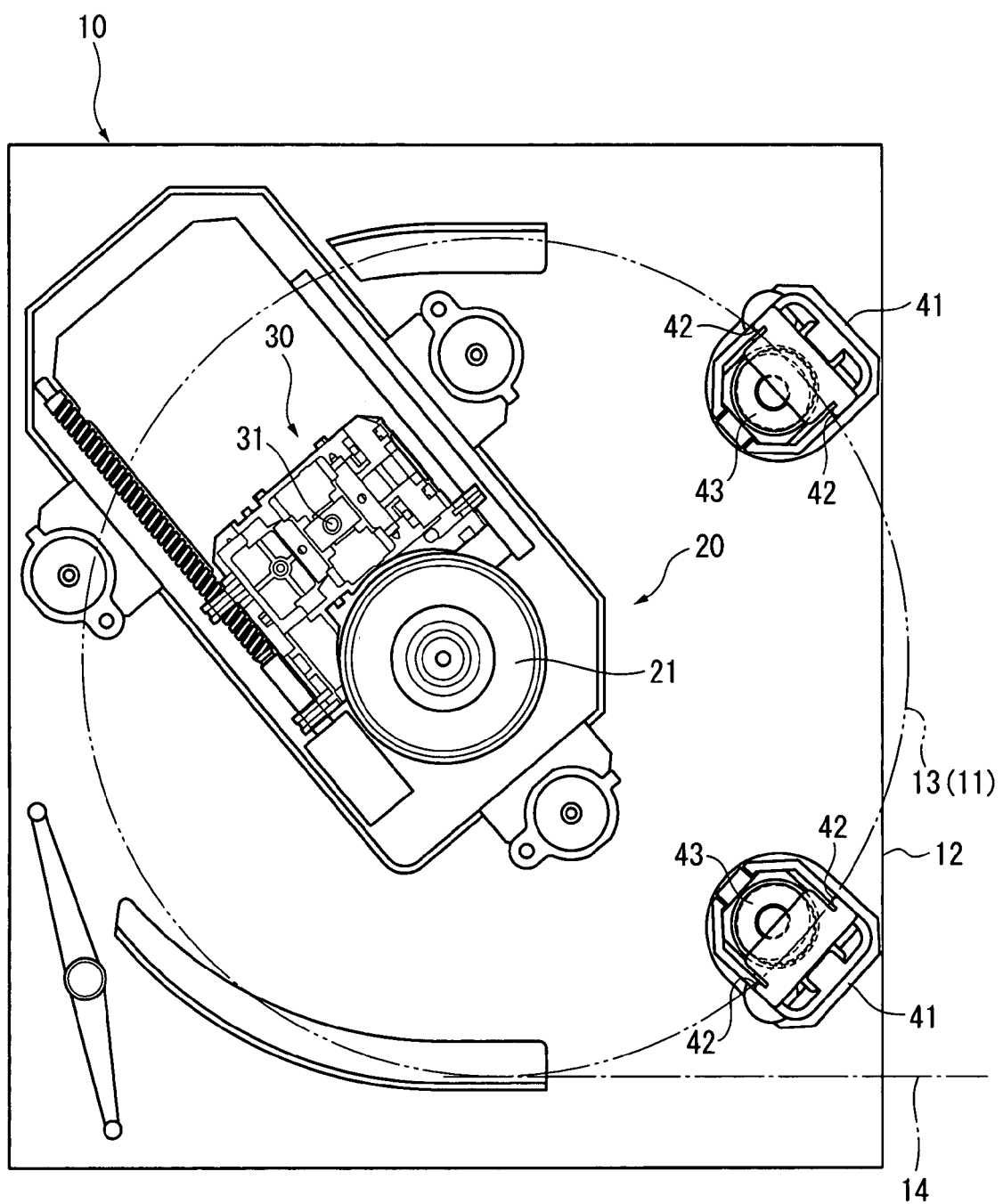
FIG. 8 is still another partially-omitted plan view showing the disc transport state of the disc recording medium transport device according to the first embodiment.

In this state, the drive rollers 43 of the transport units 41 send the disc 11 in the circumferential direction with the rotation and the transport units 41 move away from each other against a biasing force of a spring or the like (not shown) that biases the transport units 41 toward each other, thereby sending the disc 11 toward an inner side of the recorder/reproducer 10 from the insertion/ejection slot 12 (see FIG. 6).

As described above, the disc 11 is transported along the transport path 14 by the pair of transport units 41. During the transport, the transport units 41 move in accordance with a profile of the circumferential end of the disc 11 on the inner side of the insertion/ejection slot 12. Specifically, the transport units 41 moves toward both outer sides of the transport path 14 in a former half period of the transport and then moved back to the central area of the transport path 14 after the diameter portion of the disc 11 passes through the transport units 41. At this time, although the biasing force of the above-described spring or the like is applied, the transport units 41 move away from each other against the biasing force in the former half period of the transport. In the latter half period of the transport, the biasing force assists the transport units in moving toward each other.

During the transport of the disc 11, the base members 48 of the transport units 41 rotate in accordance with the circumferential end of the disc 11 so that the opening sides of the hood members 49 are constantly maintained to be oriented to the center of the disc 11.

The disc 11 is transported to the predetermined rotation position 13 by the transport units 41 as described above and received and clamped by the rotary drive mechanism 20 (see FIG. 1).

After the disc 11 is received by the rotary drive mechanism 20, the transport units 41 are retracted by the retracting mechanism to the outer sides of the transport path 14. With the arrangement, as shown in FIG. 1, the transport units 41 are maintained to be positions remotest from the disc 11 clamped by the rotary drive mechanism 20, so that the disc 11 can be moved in its rotation axis direction, namely in a direction intersecting with the surfaces of the disc 11 or with the transport path 14.

Meanwhile, in order to eject the clamped disc 11, operations are performed reversely to the above operations. At this time, the drive roller 43 on the right side in the insertion direction is rotated counterclockwise, while the drive roller 43 on the left side in the insertion direction is rotated clockwise, thereby ejecting the disc 11 from the insertion/ejection slot 12.

According to the first embodiment described above, the following advantages can be attained.

(1) Since the disc recording medium transport device of the first embodiment includes the transport units 41 that are adapted to be movable between the lateral sides and the central area of the transport path while slidably contacting with around the circumferential end portion of the disc 11 that is being transported, the disc 11 can be transported to a predetermine position by the transport units 41. In addition, since the transport units 41 each include the holding section 41A that holds the disc 11 and the transport section 41B that transports the disc 11 and the holding section 41A holds the disc 11 in transporting the disc 11, the disc 11 is not disengaged from the transport section 41B. With the arrangement, a transport distance of the disc 11 can be lengthened as compared to a related art transport device in which the disc 11 is sandwiched from diametrical sides thereof by a pair of rollers. Accordingly, it is not necessary to arrange in line a plurality of the transport sections 41B in the transport direction, thereby realizing space-saving and downsizing of the device.

(2) The transport section 41B includes the drive roller 43 that contacts with around the circumferential end portion on the principal plane of the disc 11, so that the disc 11 contacting with the drive roller 43 can be transported by rotating the drive roller 43. Accordingly, by controlling a rotation speed of the drive roller 43, the disc 11 can be transported by a predetermined distance.

(3) The holding section 41A includes the hood member 49 that sandwiches the disc 11 with the drive roller 43, the disc 11 can be securely held between the drive roller 43 and the hood member 49 and transported to the predetermined position without being disengaged therefrom.

(4) Since the pressing hood member 49 contacts with the principal plane of the disc 11 that is opposite to the principal plane with which the drive roller 43 contacts to press the disc 11 against the drive roller 43, so that the disc 11 is sandwiched by the drive roller 43 and the hood member 49 in its thickness direction. With the arrangement, the disc 11 is not disengaged from the transport section 41B and can be transported to the predetermined position more securely.

(5) The drive roller 43 is a cylindrical roller with its central axis being comprised in the inclined rotation shaft 45 and the inclined rotation shaft 45 is a cylindrical roller that is inclined relative to the direction vertical to the principal plane of the disc 11, so that not the entire end surface but an outer circumferential edge of the end surface of the drive roller 43 slidably contacts with the outer circumferential end of the disc 11. Accordingly, a slidably-contacting portion of the disc 11 contacting with the drive roller 43 is limited to the outer circumferential end or edge of the disc 11 where recording/reproduction is not affected, the recording/reproduction of the device is not affected.

(6) Since the intersection point of the inclined rotation shaft 45 of the drive roller 43 and the principal plane of the disc 11 is positioned on the side of the center of the disc 11 relative to the outer diameter of the disc 11 during the transport of the disc 11, the drive roller 43 does not protrude outward from the outer diameter of the disc 11, thereby realizing downsizing of the transport device.

(7) Since the hood member 49 has the inclined surface 49B that slidably contacts with the circumferential end portion of the disc 11, the hood member 49 does not contact with a wide area of the principal plane of the disc 11, thereby causing no damage on the disc 11. In addition, the inclined surface 49B allows the disc 11 to be smoothly guided between the hood member 49 and the drive roller 43, so that the transport of the disc 11 can be performed smoothly.

(8) The transport unit 41 is arranged such that the holding section 41A and the transport section 41B are provided on the base member 48 that is rotatable around an axis in the direction vertical to the principal plane of the disc 11 (i.e., holder shaft 52A), so that the transport unit 41 can securely hold and roll on the circumferential end of the disc 11 at any position on the circumferential end of the disc 11 irrespective of the tangent line thereof.

(9) The transport unit 41 includes the pair of contact sections 42 interposing therebetween the contact point at which the drive roller 43 contacts with the principal plane of the disc 11, and the pair of contact sections 42 rotates the transport unit in accordance with the circumferential direction of the disc recording medium while contacting with the lateral surface of the disc recording medium, thereby guiding the disc 11 to the predetermined position. Accordingly, the disc 11 can be transported to the predetermined position without deviating from the transport path.

(10) Since the transport unit 41 is biased toward the center of the transport path, the transport unit 41 can securely hold and roll on the disc 11 irrespective of the shape of the circumferential end of the disc 11.

(11) The transport units 41 are arranged so as to be retracted to the both outer sides of the transport path 14, a sufficient clearance can be provided between the transport units 41 and the disc 11 held by the rotary drive mechanism 20. Accordingly, the arrangement can also be applied to a disc changer in which the rotary drive mechanism 20 and the disc 11 need to be moved vertically.

(12) The hood member 49 is rotatably attached to the base member 48 and the compression spring 50 that biases the hood member 49 toward the drive roller 43 is interposed between the base member 48 and the hood member 49, so that the hood member 49 and the drive roller 43 can sandwich the disc 11 with a predetermined biasing force. With the arrangement, the disc 11 can be transported by the drive roller 43 without slipping.

Second Embodiment

Next, a second embodiment of the present invention will be described with reference to FIG. 9. The second embodiment is the same as the first embodiment except the arrangement of the transport unit 41. In the following description of the second embodiment, the components same as those in the first embodiment are denoted by the same reference symbols and the description thereof will be omitted.

Figure 9:
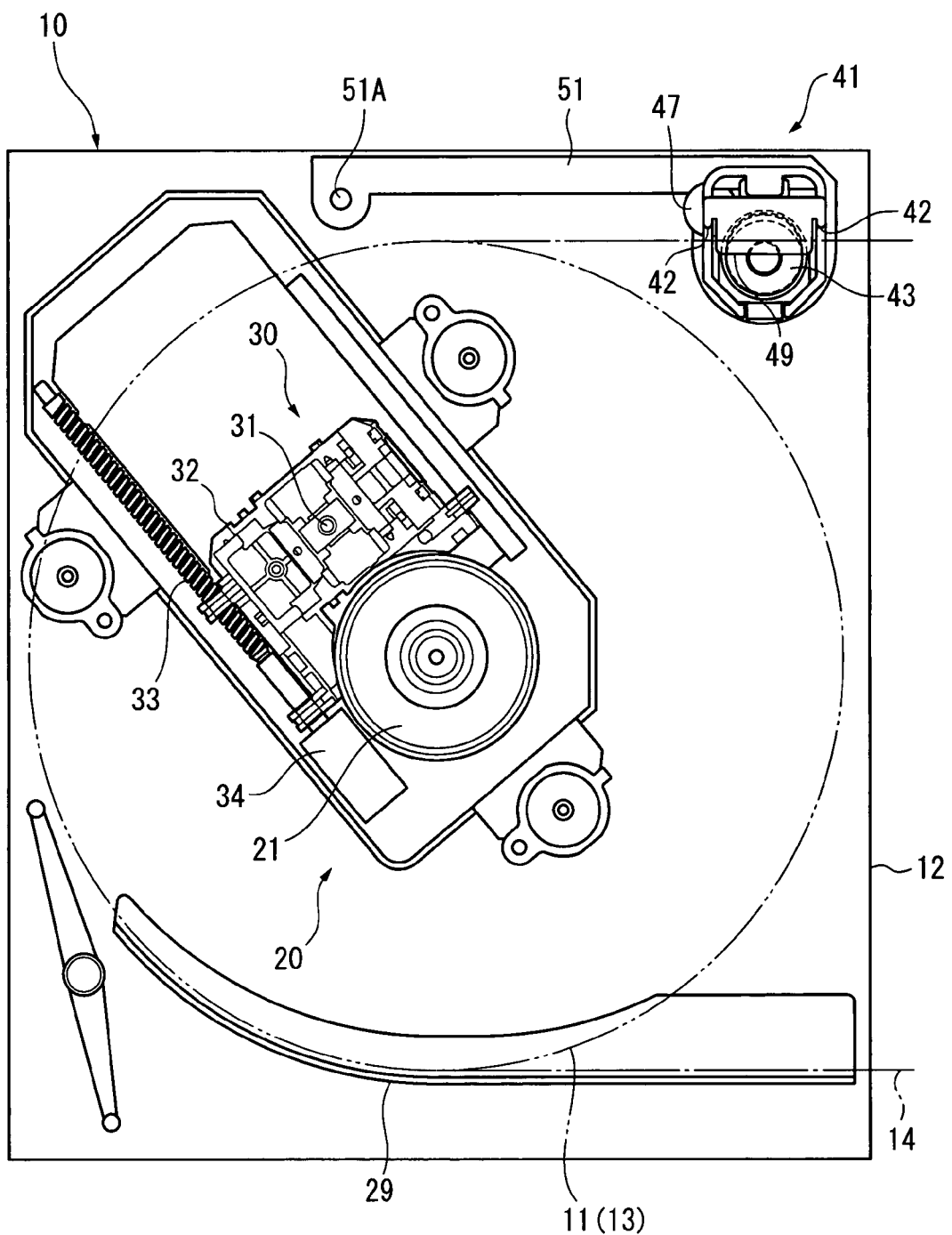
FIG. 9 is a partially-omitted plan view of a disc recording medium transport device according to a second embodiment of the present invention.

FIG. 9 shows the entire arrangement of the second embodiment, which corresponds to FIG. 1.

In FIG. 9, a distal end of a rotating arm 51 is provided with the transport unit 41 and a proximal end of the rotating arm 51 is rotatably attached to a case of the recorder/reproducer 10 via a rotary shaft 51A. The rotating arm 51 is arranged along an outer end portion of the recorder/reproducer 10 that intersects with the insertion/ejection slot 12, the distal end of the rotating arm 51 that is provided with the transport unit 41 biased toward the hub 21 by a biasing unit (not shown).

The receiving member 29 is provided at a position opposing the rotating arm 51, the receiving member 29 extending toward the insertion/ejection slot 12.

In the second embodiment, the disc 11 is sandwiched by the transport unit 41 and the receiving member 29. By rotating the drive roller 43 of the transport unit 41, the disc 11 is transported in a manner rotating along the receiving member 29. Even when a sandwiching position (relative position) of the receiving member 29 and the transport unit 41 is changed due to the transport of the disc 11, the rotatably arranged transport unit 41 can constantly hold the disc 11 with the receiving member 29, so that the disc 11 can be transported.

According to the second embodiment described above, the following advantage can be attained in addition to the advantages (1) to (12) of the first embodiment.

(13) Since the transport unit 41 is attached to the rotating arm 51 and the receiving member 29 is arranged at the position opposing the rotating arm 51, it is only necessary to provide the transport unit 41, which is a complicated mechanism, at one position, so that the device can be simplified as compared to the first embodiment.

The present invention is not limited to the above-described embodiments, but includes modifications and improvements as long as the object of the present invention can be achieved.

For example, although the compression spring 50 is employed as the biasing unit that is disposed between the base member 48 and the hood member 49 to bias the hood member 49 toward the drive roller 43 in the first embodiment, an elastic member such as a tension spring and a platy rubber may be used instead of the compression spring 50 or the hood member 49 may be formed of an elastic member such as a rubber.

In order to transfer the drive force from the horizontal gear 47, without limiting to the gears used in the embodiments above, other transfer members such as other types of gears, a friction gear and a belt may be used. For example, instead of the transfer pin provided on the lower surface side of the roller base 44, a gear may be formed on a lateral surface of the roller base so as to be meshed directly with the drive gear.

The inclination angle of the drive roller 43 is 10 degrees in the embodiments above, the inclination angle may be suitably selected.

However, too large inclination angle causes a variation of a press-contact force in rolling to be large depending on a variation in an insertion degree of the disc 11. On the other hand, too small inclination angle might cause the drive roller 43 to roll on an inner side relative to the circumferential end of the disc 11, which is not preferable.

Although, the drive roller 43 rolls on the back surface of the disc 11 while the hood member 49 slidably contacts with the front surface of the disc 11 in the embodiments above, the front and back surfaces of the disc 11 in this arrangement may be reversed. In either case, the drive roller 43 can securely roll on and the hood member 49 can securely contact with only around the circumferential end of the disc 11, thereby avoiding an adverse influence on other areas of the disc 11.

In addition, specific mechanisms or detailed arrangements of the rotary drive mechanism 20, the recording/reproducing mechanism 30 and the transport mechanism 40 may suitably employ known arrangements, which may be suitably changed in implementing the present invention.

Advantage of Embodiment

As described above, since the transport units 41 each include the holding section 41A that holds the disc 11 and the transport section 41B that transports the disc 11 and the holding section 41A holds the disc 11 in transporting the disc 11 in the embodiments above, the disc 11 is not disengaged from the transport section 41B. With the arrangement, the transport distance of the disc 11 can be lengthened as compared to a related art transport device in which the disc 11 is sandwiched from diametrical sides thereof by a pair of rollers. Accordingly, it is not necessary to arrange in line a plurality of the transport sections 41B in the transport direction, thereby realizing space-saving and downsizing of the device.

INDUSTRIAL APPLICABILITY

The present invention is applicable to a disc recording medium transport device that transports a disc recording medium.

The invention claimed is:

1. A disc recording medium transport device that transports a disc recording medium between an insertion/ejection slot and a rotary drive position, the device comprising:
   a transport unit that is movable between a central area and lateral side areas of a transport path in a manner slidably contacting with around a circumferential edge portion of the disc recording medium that is being transported, the transport unit including a holding section that holds the disc recording medium and a transport section that transports the disc recording medium,
   the transport section including a drive roller that contacts the disc recording medium, on a principal plane of the disc recording medium, around the circumferential edge portion of the disc recording medium, the drive roller comprising a cylindrical roller with its central axis being comprised in a rotation shaft, the cylindrical roller including an axial-end surface contacting only the circumferential edge portion of the disc recording medium, the axial-end surface being inclined relative to the principal plane such that the rotation shaft is inclined relative to a direction perpendicular to the principal plane of the disc recoding medium by a predetermined angle.

2. The disc recording medium transport device according to claim 1, wherein the holding section includes a pressing member that sandwiches the disc recording medium with the drive roller.

3. The disc recording medium transport device according to claim 2, wherein the pressing member contacts with a principal plane of the disc recoding medium that is opposite to the principal plane with which the drive roller contacts, the pressing member pressing the disc recording medium against the drive roller.

4. The disc recording medium transport device according to claim 1, wherein the drive roller is arranged such that intersection points of the inclined rotation shaft and the principal planes of the disc recording medium is positioned on a side of a center relative to an outer diameter of the disc recording medium during transport of the disc recording medium.

5. The disc recording medium transport device according to claim 2, wherein the pressing member has an inclined surface that slidably contacts with around the circumferential edge portion of the disc recording medium.

6. The disc recording medium transport device according to claim 1, wherein the transport unit is arranged such that the holding section and the transport section are disposed on a base member that is rotatable around a rotation axis in a direction perpendicular to the principal planes of the disc recoding medium.

7. The disc recording medium transport device according to claim 1, wherein the transport unit includes a pair of contact sections interposing therebetween a contact point at which the drive roller contacts with the principal plane of the disc recording medium, the pair of contact sections rotating the transport unit in accordance with a circumferential direction of the disc recording medium while contacting with a lateral surface of the disc recording medium.

8. The disc recording medium transport device according to claim 1, wherein the transport unit is biased toward the central area of the transport path.

* * * * *